United States Patent
McIntyre et al.

[11] Patent Number: 5,860,541
[45] Date of Patent: *Jan. 19, 1999

[54] TEAT WITH RELAXED INLET VALVE

[75] Inventors: Robert Dymock McIntyre, McIntyre's Lane, R D 5, Hunterville; Robin Whitfield, Palmerston North, both of New Zealand

[73] Assignee: Robert Dymock McIntyre, Hunterville, New Zealand

[*] Notice: The term of this patent shall not extend beyond the expiration date of Pat. No. 5,638,769.

[21] Appl. No.: 817,244

[22] PCT Filed: Sep. 29, 1995

[86] PCT No.: PCT/NZ95/00098

§ 371 Date: Apr. 9, 1997

§ 102(e) Date: Apr. 9, 1997

[87] PCT Pub. No.: WO96/11569

PCT Pub. Date: Apr. 25, 1996

[30] Foreign Application Priority Data

Oct. 12, 1994 [NZ] New Zealand ............................ 264669
Sep. 29, 1995 [WO] WIPO ................................... 96/11569

[51] Int. Cl.$^6$ .............................. A01K 9/00; A61J 11/00
[52] U.S. Cl. .......................................... 215/11.4; 215/11.1
[58] Field of Search ................... 215/11.1, 11.4, 215/11.5

[56] References Cited

U.S. PATENT DOCUMENTS

| | | | |
|---|---|---|---|
| 1,270,693 | 6/1918 | Caldwell | 215/11.1 |
| 2,143,661 | 1/1939 | Schrader | 215/11.1 X |
| 2,219,604 | 10/1940 | Trotter | 215/11.1 X |
| 2,223,179 | 11/1940 | Lougheed | 215/11.1 |
| 2,350,215 | 5/1944 | Christensen | 119/71 |
| 2,597,483 | 5/1952 | Head, Sr. | 215/11.4 X |
| 2,607,319 | 8/1952 | Shappee | 119/71 |
| 2,628,591 | 2/1953 | Coyner | 119/71 |
| 2,688,326 | 9/1954 | Lerman | 215/11.1 |
| 2,697,414 | 12/1954 | Coyner | 119/71 |
| 2,708,421 | 5/1955 | Jauch . | |
| 2,747,573 | 5/1956 | Schaich | 215/11.4 |
| 2,800,107 | 7/1957 | Niggeler | 119/71 |
| 2,831,484 | 4/1958 | Garner | 215/11.1 X |
| 2,960,088 | 11/1960 | Witz | 215/11.4 |
| 3,424,157 | 1/1969 | Di Paolo | 215/11.4 |
| 4,633,814 | 1/1987 | Eastman et al. | 119/71 |
| 4,915,242 | 4/1990 | Marte | 215/11.1 |
| 4,969,564 | 11/1990 | Cohen et al. | 215/11.1 |
| 5,072,842 | 12/1991 | White | 215/11.4 |
| 5,638,769 | 6/1997 | McIntyre et al. | 215/11.1 X |

FOREIGN PATENT DOCUMENTS

| | | |
|---|---|---|
| 140996 | 4/1950 | Australia . |
| 54485/80 | 7/1983 | Australia . |
| 44642/93 | 9/1994 | Australia . |
| 384394 | 8/1990 | European Pat. Off. ............. 215/11.1 |
| 741871 | 11/1943 | Germany . |
| 567265 | 10/1957 | Italy ..................................... 215/11.1 |
| 10524 | 3/1902 | Norway ................................ 215/11.1 |
| 1351549 | 11/1987 | U.S.S.R. . |
| 531916 | 1/1941 | United Kingdom . |
| 936 992 | 9/1963 | United Kingdom . |
| WO 94/04023 | 3/1994 | WIPO . |

*Primary Examiner*—Sue A. Weaver
*Attorney, Agent, or Firm*—Young & Thompson

[57] ABSTRACT

A teat or nipple for the feeding of young animals. The teat is formed by a hollow body (10) made of a resilient material. The body has an inlet end (11) and an outlet end (12). The outlet end includes one or more slits (20) through the wall (19) of the body. The slit or slits (20) do not extend into that area (18) of the wall (19) of the body which forms the extremity (18) of the outlet end (12). A valve 26, 27) is located in the inlet end (11), said vale having a bore (30) with a pair of flaps (36) at the inner end of the bore, these flaps defining an outlet slot (38) through which liquid passing through one end of the bore can pass into the interior of the hollow body. The valve in its relaxed state is open to permit such flow to occur but the flaps are such as to close the outlet slot (38) upon any reverse flow of liquid from the interior of the hollow body occurring.

12 Claims, 3 Drawing Sheets

TEAT WITH RELAXED INLET VALVE

BACKGROUND OF THE INVENTION

This invention relates to improvements in teats of the type used in the feeding of animals particularly the rearing of young animals such as calves.

DESCRIPTION OF THE RELATED ART

In my New Zealand Patent Specification 247058 there is described and claimed a teat for the feeding of young animals, this teat having proved in use to be extremely effective as an animal suckling on the teat can over a given period of time obtain a greater volume of feed than with conventional teats. I have now developed an improvement to that teat to make it even easier and more effective for an animal to obtain maximum flow of feed with a minimum of effort.

SUMMARY OF THE INVENTION

Broadly, the present invention provides a teat comprising a hollow body made of a resilient material, said body having an inlet end and an outlet end, said outlet end including one or more slits through the wall of the body characterised in the said at least one slit does not extend into that area of the wall of the body which forms the extremity of the outlet end, said inlet end having a bung inserted therein, said bung incorporating a valve, said valve in its relaxed state being open to permit flow from the inlet end of the body to the outlet end to occur. Preferably the bung and valve are moulded as a single unit from an elastomeric plastics material.

In the preferred form of the invention the valve includes a flap or flaps which are located within the hollow interior of the body and which close the valve immediately a pressure differential occurs between the hollow interior and that part of the bung which opens to the exterior of the teat body.

BRIEF DESCRIPTION OF THE DRAWINGS

In the following more detailed description of the invention reference will be made to the accompanying drawings in which.

The content of my New Zealand Patent Specification 247058 is incorporated herein by way of specific reference.

Figure 1:
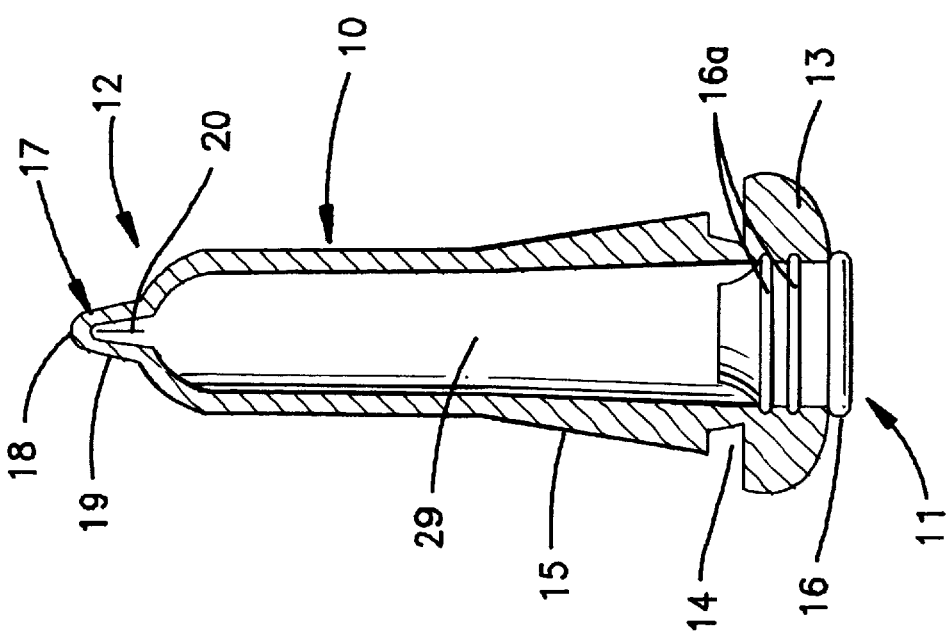
FIG. 1 is a cross-sectional illustration of the teat disclosed in my New Zealand Patent Specification 247058.

As shown in FIG. 1 the teat 10 has an inlet end 11 and an outlet end 12. The inlet end 11 is provided with a radially disposed flange 13 adjacent which is a groove 14. This groove 14 is defined by flange 13 and an end wall surface of an outwardly flared body portion 15.

A bung 16 is inserted in the inlet end 11, this bung having a plurality of annular ribs 16a which engage in correspondingly spaced and shaped grooves in flange 13. Other means of retaining the bung in the inlet end can be employed as will be appreciated by those skilled in the art. For example bung 16 could be held in place by a suitable adhesive or a bonding method suited to the plastic materials used for the bung and teat.

The outlet end has a nipple 17 with a forwardly facing curved end wall 18 and a side wall 19 which merges into the curved wall portion defining the outlet end 12. A plurality of slits 20 are provided for the outflow of feed, these slits extending alongside wall 19 from generally the point where it merges into the curved end wall portion of the outlet end 11. These slits do not extend across end wall 18 and preferably terminate at or just into the area of wall 18 where in merges into side wall 19.

As an alternative to the substantially longitudinally aligned slits 20 a spiral cut extending about side wall 19 could be provided.

Figure 2:
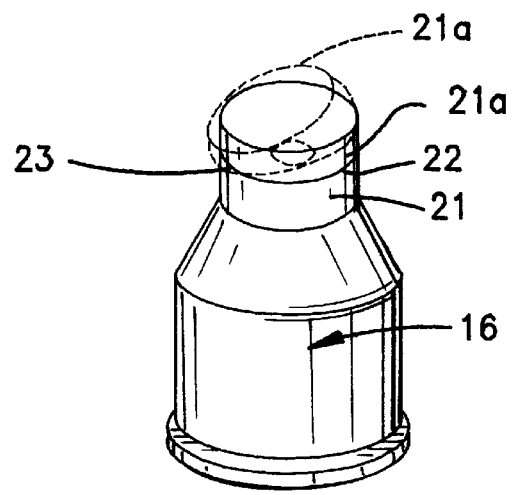
FIG. 2 is a perspective view of a bung for insertion into the inlet end of the teat.

In the form of the bung 16 illustrated in FIG. 2 the bung is molded from a suitable plastics material and the end 21 thereof which is innermost when bung 16 is inserted into the teat 10 is molded closed. In a post-molding operation, however, a peripheral cut 22 is formed in end 21 but does not extend completely about the end thus leaving an area of connecting material 23 which forms a hinge. The resultant flap 21a thus does not in the normal relaxed state sealingly close the bore through which liquid (milk product) can flow through the bung. This is because the hinge applies a biasing force which prevents flap 21a from sitting tight down on end 21 of the bung.

With the teat 10 full of feed (milk) an animal applies a squeezing action to the teat which not only causes milk to flow out through the slit(s) 20 but also to normally force back through the bung 16. Consequently the full charge of milk within the cavity 29 of teat 10 is not received by the animal.

However, with the valve according to the present invention the squeezing action of the animal causes the milk to apply a back pressure which ensures that flap 21a sealingly seats on the end 21 of the bung 16 thereby preventing back flow of milk through the bung 16. When the animal releases the teat 10 the pressure differential between the chamber 29 of the teat and the milk supply to the teat (via bung 16) causes milk to flow through the bung 16 thereby lifting flap 21a to an open position (as shown in dotted detail in FIG. 2). This ensures that a full charge of milk is received in chamber 29 via bung 16 prior to the animal next applying a squeezing action to the teat.

Figure 4:
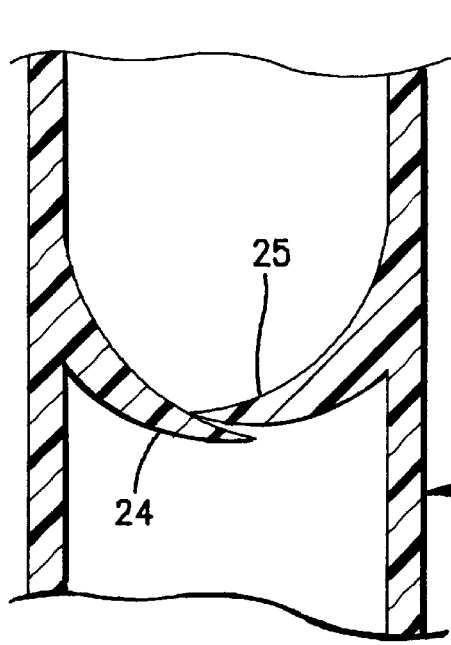
FIG. 4 is a cross-sectional illustration of a valve arrangement for incorporation as an integral part of the bung, the valve being shown in the closed position.
Figure 5:
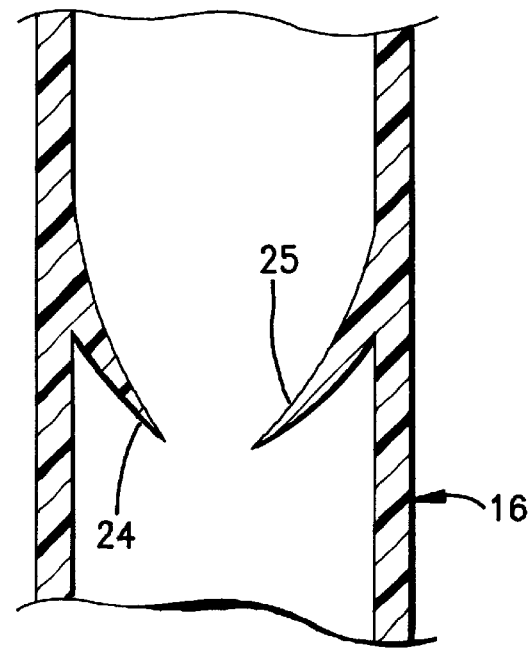
FIG. 5 is a view similar to FIG. 3 but showing the valve in an opened position.

Other means of forming the valve integrally with the bung 16 can be provided. For example, in FIGS. 4 and 5 there is shown a valve arrangement which can be molded within the bung 16 and is comprised of a pair of overlapping flaps 24 and 25, these flaps taking up the overlapping position and thereby closing the valve when there is a back flow (i.e., the animal squeezes on the teat) and move apart to open the valve when the animal has ceased squeezing and milk flows from the milk supply into the chamber 29 of the teat 10.

Figure 3:
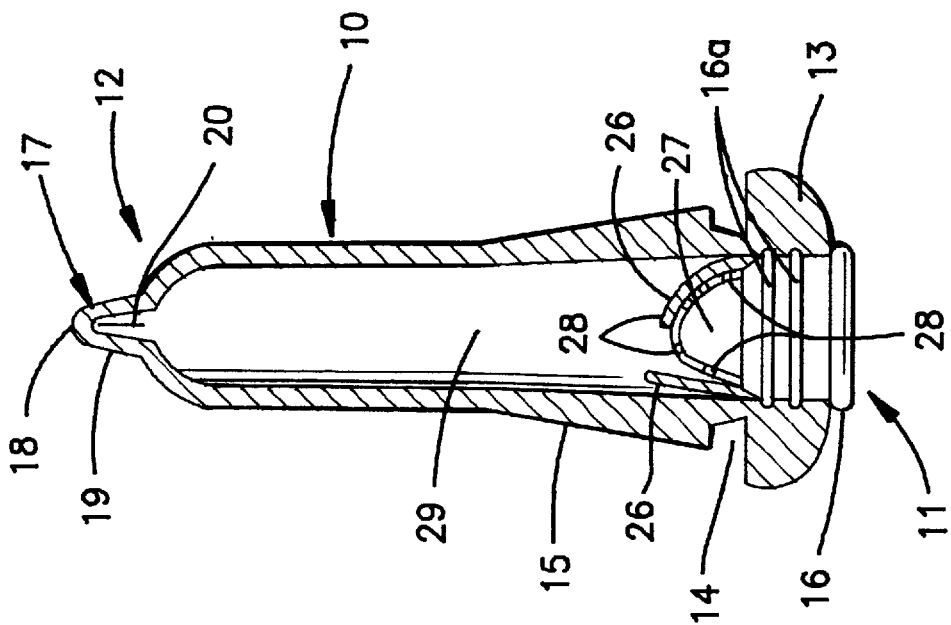
FIG. 3 is a cross-sectional illustration of a second form of the valved bung inserted in the end of the teat.

In the arrangement shown in FIG. 3 there is shown a further arrangement where flaps 26 are molded integrally with the body of the teat 10 and cover a plurality of openings 28 formed in an otherwise closed end 27 of bung 16. Thus once again the flaps can move open (as illustrated on the left hand side of the drawing) to allow milk to flow into the chamber 29 and can close (as shown on the right hand side) in the event of a back flow caused by the animal squeezing on the teat.

Further arrangements will be readily apparent to those skilled in the art. For example, the end 21 of bung 16 as shown in FIG. 2 could be of a configuration which narrows to a point which includes either a transverse or longitudinal slit or slits operable in a manner similar to a conventional teat or indeed according to the configuration of slits 20 in the nipple 17 of the teat of the present invention.

A bung 16 of this particular type is, for example, illustrated in FIGS. 6–11 of the drawings. As with the previous arrangements, the bung 16 is generally cylindrical in shape and has a through bore or flow passage 30. A peripheral shoulder 31 is formed at the end of the bung which is situated at or protrudes from the inlet end of teat 10. This shoulder engages against the end of the teat.

Adjacent the end of the bore 30 which is at the shoulder 31 end of the bung there is provided one or more circumferential ribs 32. At or adjacent the other end of the bore is a pair of diametrically opposed radiused projections 33. Accordingly, the end of a tube can be inserted into the bore 30 and frictionally held therein by ribs 32. The radiused projections 33 form a stop for the end of the tube.

Projecting from the end of the bungs 16 which in use is innermost in the teat 10 is a valve projection 34 which is concentric with bore 30 and is formed by a pair of flaps 36 which are integrally formed with the bung 16. The flaps are conjoined as shown but defined at their outermost end an elongate slot 38, this slot being transverse to the longitudinal axis of bore 30. In its molded form the flaps 36 (as with the flaps of the other valve arrangements disclosed herein) do not close the bore 30.

In the preferred form of the invention the flaps are of extremely thin cross-sectional thickness and, in practices, will be thinner than illustrated being about 0.30 mm or less.

As also illustrated, the slot is of a length substantially the same as the diameter of the bore 30. By way of example the slot can be about 11.40 mm in length and about 1.00 mm wide at its mid point.

Figure 12:
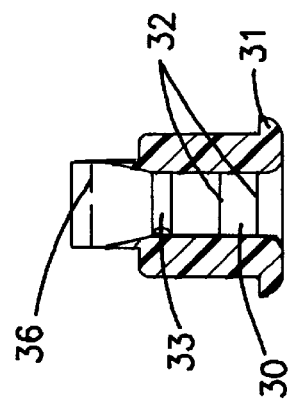
FIG. 12 is a perspective view of a tool part used in the molding of the valve and bung arrangement of FIG. 6.
Figure 11:
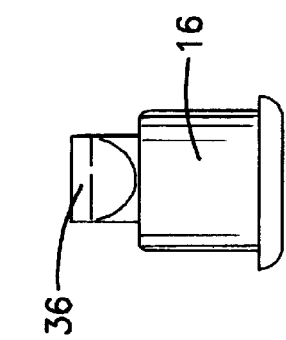
FIG. 11 is a cross-sectional view taken on line B—B of FIG. 6.
Figure 7:
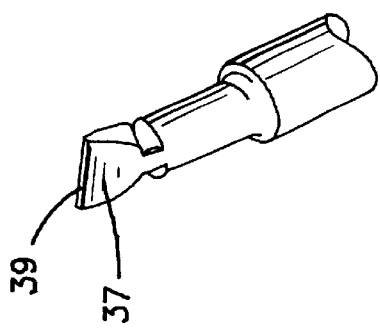
FIG. 7 is an end view of the valve of FIG. 6.
Figure 10:
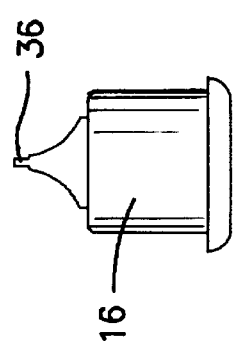
FIG. 10 is a further side elevation view of the bung and valve arrangement of FIG. 6.
Figure 6:
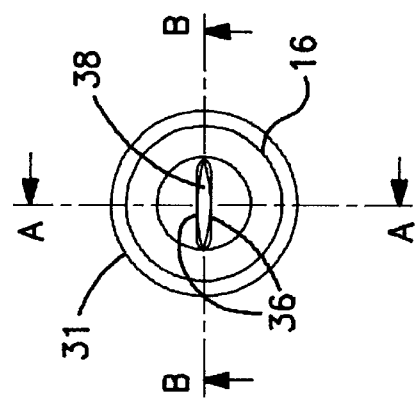
FIG. 6 is a perspective view of a further embodiment of the bung and valve arrangement according to the invention.
Figure 8:
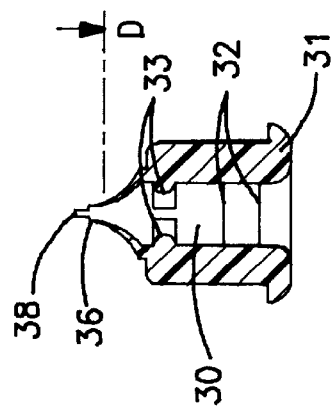
FIG. 8 is a cross-sectional view taken on line A—A of FIG. 6.
Figure 9:
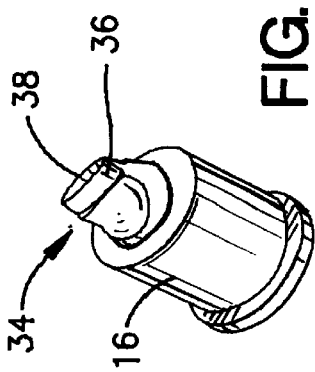
FIG. 9 is a side elevation view of the bung and valve arrangement of FIG. 6.

To achieve a slot of this type the part of the molding tool used to form the bore and the inner configuration of the flaps toward the slot is shown in FIG. 12 wherein the distal end of the tool piece is in a blade form 37 and preferably tapers to a sharp edge 39. This enables the molded bung to have flaps which are of extremely thin wall thickness in the vicinity of at least the slot and that this slot is kept as narrow as possible.

The bung and valve arrangement of FIGS. 6–11 is extremely reactive to any pressure differential between the bore 30 (or a tube inserted therein) and the interior of the teat. Thus, when a young animal squeezes on the teat the liquid in the teat immediately tries to flow back through the valve but this immediately causes the flaps to collapse or move toward one another to thereby close the slot 38. As a result no back flow through the bung can occur and a maximum charge of liquid through the slits 20 of the teat can occur.

However, upon the animal releasing pressure on the walls of the teat the slits 20 immediately close and seal the outlet end of the teat 10. This creates a further pressure differential between the interior of the teat and bore 30 (or a tube inserted in bore 30) with the result that liquid in the bore (tube) immediately flows through the slot but due to the resilient nature of the flaps and their thin wall section the slot opens as wide as possible thereby ensuring ready flow of liquid into the body of the teat so as to fill same. Upon the animal applying another squeezing action to the teat the process is recommenced whereby the flaps close to seal the bung and thereby enable a maximum of charge of liquid to pass through the slits 20 into the animal's mouth.

The valve and bung arrangements according to the present invention all operate so that little pressure differential is required to cause the valves to open and equally little pressure is required to close the valve. As a consequence a maximum charge of the liquid in the teat is received by the animal yet upon the animal releasing pressure on the teat, the teat immediately recharges. Furthermore, as the valve is in its relaxed state open there is less chance of milk deposits blocking the valve. Also it is believed that the distortion of the flaps which occurs during open and closing results in there being little chance of deposits staying on the valve long enough to gum up the valve and prevent it from operating correctly.

We claim:

1. In a teat of the type comprising a hollow body made of a resilient material, said hollow body having an inlet end and an outlet end, a valve locatable with the inlet end, said valve having a bore one end of which opens to the exterior of the hollow body and the other end of which is located in communication with the interior of the hollow body, a pair of flaps projecting from said other end of the bore and defining therebetween an outlet slot through which liquid passing through said one end of the bore can pass into the interior of the hollow body, said valve in its relaxed state being open to permit such flow to occur, said flaps being such as to close the outlet slot upon any reverse flow of liquid from the interior of the hollow body occurring.

2. A valve as claimed in claim 1 wherein the valve is molded as a single unit with a bung, said bung being insertable into the inlet end.

3. A valve as claimed in claim 2 wherein the bung and valve are molded from an elastomeric plastics material.

4. A valve as claimed in claim 1 wherein the flaps are joined together except in an area in which they define the outlet slot.

5. A valve as claimed in claim 4 wherein the flaps in at least the area of the outlet slot are of extremely thin cross-sectional thickness.

6. A valve as claimed in claim 5 wherein the flaps converge to said outlet slot from the said other end of the bore.

7. A valve as claimed in claim 6 wherein a length of the slot is substantially the same as a diameter of the bore.

8. A teat of the type comprising a hollow body made of a resilient material, said body having an inlet and an outlet end, said inlet end having a bung inserted therein, said bung incorporating a valve, said valve in its relaxed state being open to permit flow from said inlet end to said outlet end to occur, the bung including a bore, one end of which is open to the exterior of the hollow body and the other end which communicates with the interior of the hollow body, the valve including a pair of flaps projecting from said one end of the bore and defining therebetween an outlet slot through which liquid passing through said one end of the bore can pass into the interior of the hollow body.

9. A teat as claimed in claim 8 wherein the bung and valve are molded as a single unit from an elastomeric plastics material.

10. A teat as claimed in claim 9 wherein the flaps converge to said outlet slot from said one end of the bore and said flaps in at least an area of the outlet slot are of extremely thin cross-sectional thickness.

11. A teat as claimed in claim 10 wherein the flaps are joined together except in the area in which they define the outlet slot and the outlet slot has a length which is substantially the same as a diameter of the bore.

12. A teat as claimed in claim 8 wherein the bung is adhered into the inlet end of the hollow body.

* * * * *